United States Patent
Okamura

(10) Patent No.: US 7,031,029 B2
(45) Date of Patent: Apr. 18, 2006

(54) METHOD FOR SETTING BLACK REFERENCE DATA USED FOR EXCESS EXPOSURE, AND IMAGE READING APPARATUS

(75) Inventor: Yukio Okamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 553 days.

(21) Appl. No.: 10/133,746

(22) Filed: Apr. 29, 2002

(65) Prior Publication Data

US 2002/0171820 A1 Nov. 21, 2002

Related U.S. Application Data

(63) Continuation of application No. PCT/JP01/07441, filed on Aug. 29, 2001.

(30) Foreign Application Priority Data

Aug. 30, 2000 (JP) .............................. 2000-260907

(51) Int. Cl.
- *H04N 1/40* (2006.01)
- *H04N 1/04* (2006.01)
- *H04N 1/46* (2006.01)
- *G03F 3/08* (2006.01)

(52) U.S. Cl. ...................... 358/461; 358/406; 358/475; 358/482; 358/483; 358/474; 358/487; 358/504; 358/509; 358/513; 358/514; 358/519; 358/505; 358/506; 382/274; 382/319

(58) Field of Classification Search ................ 358/461, 358/482, 483, 487, 520, 512–514, 475, 519, 358/522, 509, 474, 406, 504–506; 382/274, 382/318, 319; 250/208.1; 399/207; 355/40, 355/41, 35; 348/243, 250, 251

See application file for complete search history.

(56) References Cited

U.S. PATENT DOCUMENTS

| | | | | |
|---|---|---|---|---|
| 6,032,864 | A | * | 3/2000 | Hamasuna ............. 235/462.25 |
| 6,046,827 | A | * | 4/2000 | Ogoshi et al. .............. 358/487 |
| 6,055,066 | A | * | 4/2000 | Kanda ........................ 358/461 |
| 6,191,873 | B1 | * | 2/2001 | Mizoguchi et al. ......... 358/516 |
| 6,685,313 | B1 | * | 2/2004 | Scofield et al. ............. 347/105 |

FOREIGN PATENT DOCUMENTS

| | | |
|---|---|---|
| JP | A 1-241268 | 9/1989 |
| JP | A 4-334259 | 11/1992 |
| JP | A 6-253149 | 9/1994 |
| JP | A 9-163135 | 6/1997 |

(Continued)

*Primary Examiner*—Cheukfan Lee
(74) *Attorney, Agent, or Firm*—Oliff & Berridge, PLC

(57) ABSTRACT

By performing preliminary scanning, a document identification unit determines whether a document is a dark document, such as a negative film, that requires excess exposure, or an ordinary document that does not require excess exposure. When it is determined that the document does not require excess exposure, an exposure time setting unit sets an exposure time for a line sensor. Then, in consonance with the designated exposure time, the line sensor initiates the reading of a black reference. Thereafter, in accordance with an excess exposure time that is designated, a black reference data preparation unit prepares black reference data. Since the black reference is read during the same period as the excess exposure time and the black reference data is prepared, the detailed tones of the dark portion of the document can be expressed, and the quality of the image can be improved.

4 Claims, 4 Drawing Sheets

FOREIGN PATENT DOCUMENTS

| JP | 11069162 A | * | 3/1999 |
| JP | A 11-69162 | | 3/1999 |
| JP | A 2000-69251 | | 3/2000 |
| JP | A 2001-45221 | | 2/2001 |

* cited by examiner

METHOD FOR SETTING BLACK REFERENCE DATA USED FOR EXCESS EXPOSURE, AND IMAGE READING APPARATUS

BACKGROUND OF THE INVENTION

The present invention relates to a method for setting black reference data for a image pickup device, and in particular, to a method for setting black reference data used for excess exposure, and an image reading apparatus.

Generally, a well known image reading apparatus projects light from a light source onto a document positioned on a document table, and read, as image data, light, that is reflected by the document, or that passes through the document, by an image pickup device.

The image pickup device used for this image reading apparatus comprises multiple pixels composed of charge coupling devices. An electric signal corresponding to the strength of the received light is output from the multiple pixels that constitute the image pickup device.

For the electric signal output from the image pickup device of the image reading apparatus, the variation in the sensitivity of the image pickup device or the variation in the amount of light emitted by the light source must be corrected. Therefore, the apparatus reads a black reference and a white reference before scanning a document, and prepares black reference data and white reference data. The thus prepared black reference data and white reference data are employed to perform shading correction for an electric signal output from the image pickup device.

An exposure time (also called a "charge accumulation period") is determined for the image pickup device, so that the maximum value output from the image pickup device during the reading of the white reference is a predetermined value. This exposure time is a basic exposure time, and is set in accordance with the colors of light received by the image pickup device; such as, for example, red (hereinafter referred to as R), green (hereinafter referred to as G) or blue (hereinafter referred to as B). That is, the exposure time differs depending on the color of the light received by the image pickup device. Generally, a document is read based on the basic exposure time of the image pickup device. However, for a document such as a negative film, many low tone areas are included and the amount of R, G and B data is unbalanced. When such a document is scanned during the basic exposure time set for the image pickup device, a detailed, tonal expression of the dark portions is difficult, and the quality of the image that is read cannot be improved.

In order to implement the detailed tonal expression of the dark portions of the document, the gamma function may be changed to increase the output value. However, when the output value is increased by using the gamma function, the noise element included in the electric signal output by the image pickup device is also amplified. As a result, noise included in image data is amplified and the image quality is deteriorated.

To resolve this problem, excess exposure is employed whereby for the image pickup device the exposure time is extended beyond that for the basic exposure time, and the tones of the dark portion of a document are represented in detail. By using the excessive exposure time, the amplification of noise included in image data can be prevented, and accordingly, the deterioration of the image quality can be avoided.

However, the process for reading a document using the excess exposure does not take into account the exposure time required for the reading of a black reference. Therefore, the black reference data read during the basic exposure time is employed, regardless of the document type or the light received by the image pickup device. The black reference data is set, for example, by averaging the values of the dark portions output by the pixels that constitute the image pickup device.

For the black reference data set by averaging the output value in the above described manner, generally one value is employed for all the pixels, even when multiple pixels constitute the image pickup device. Therefore, to read a dark image, such as a negative film image, a problem has arisen in that the tones of a dark portion can not be expressed in detail for each pixel. In other words, when excess exposure time is employed, the tones of a dark portion included in a dark image can not be expressed by using the black reference data that is prepared based on the average black reference that is read during the basic exposure time.

SUMMARY OF THE INVENTION

It is, therefore, one objective of the present invention to provide a method for preparing black reference data used during the employment of excess exposure time that improves the accuracy of black reference data and of image quality.

Further, it is another objective of the present invention to provide an image reading apparatus that reduces the noise included in image data and that improves image quality.

According to a black reference data setting method of the invention, when the time for an exposure time is n times that for a basic exposure time, the reading of a black reference is performed for a period for which the time is n times that of the basic exposure time. Therefore, when excess exposure, the timing of which exceeds that of the basic exposure time, is employed, the black reference is read in accordance with the exposure time for the excess exposure timing, and black reference data to be used for the excess exposure is prepared. For example, when during a timed period that is n times the length of the basic exposure time allocated for each color the light colors received by image pickup device constitute the three colors R, G and B, the image pickup device for receiving the light for each color reads black reference data. Then, since the black reference data corresponding to the excess exposure is prepared for each light color received by the image pickup device, the accuracy of the black reference data can be improved, and for a dark document, such as a negative film image, the image quality can also be improved.

As is described above, the basic exposure time is an exposure time wherein during the reading of a white reference the image pickup device outputs a predetermined value as the maximum value.

According to a black reference data setting method of the present invention, the exposure time is established based on a gamma curve that is set at the preliminary scanning step. By using the gamma curve, the exposure time is designated for a document, and the black reference data is prepared in accordance with the exposure time that has been established. Therefore, an appropriate exposure time can be established that is in accordance with the document type, and the black reference data can be prepared in consonance with the exposure time. Thus, accurate black reference data can be created in accordance with the type of a document that is read, and the image quality of the document can be improved.

According to a black reference data setting method of the present invention, black reference data is created for each pixel constituting the image pickup device. Thus, optimal shading corrections can be performed for the data output by each pixel of the image pickup device, and the quality of an image that is read can be improved.

According to an image reading apparatus of the present invention, a determination is made as to whether excess exposure is required for a document that is to be read. When it is determined that excess exposure is required, an exposure time is established for which the timing is a predetermined number of times that of a basic exposure time. Then, during a period for which the timing is a predetermined number of times that which has been established for the basic exposure time, a black reference data preparation unit reads a black reference and creates black reference data. Consequently, the exposure time is set in accordance with the document type, and the black reference data is prepared in accordance with the exposure time that has been established. Thus, within a dark portion, the tones can be satisfactorily expressed, and the quality of the image that is read can be improved.

DETAILED DESCRIPTION OF PREFERRED EMBODIMENTS

Figure 1:
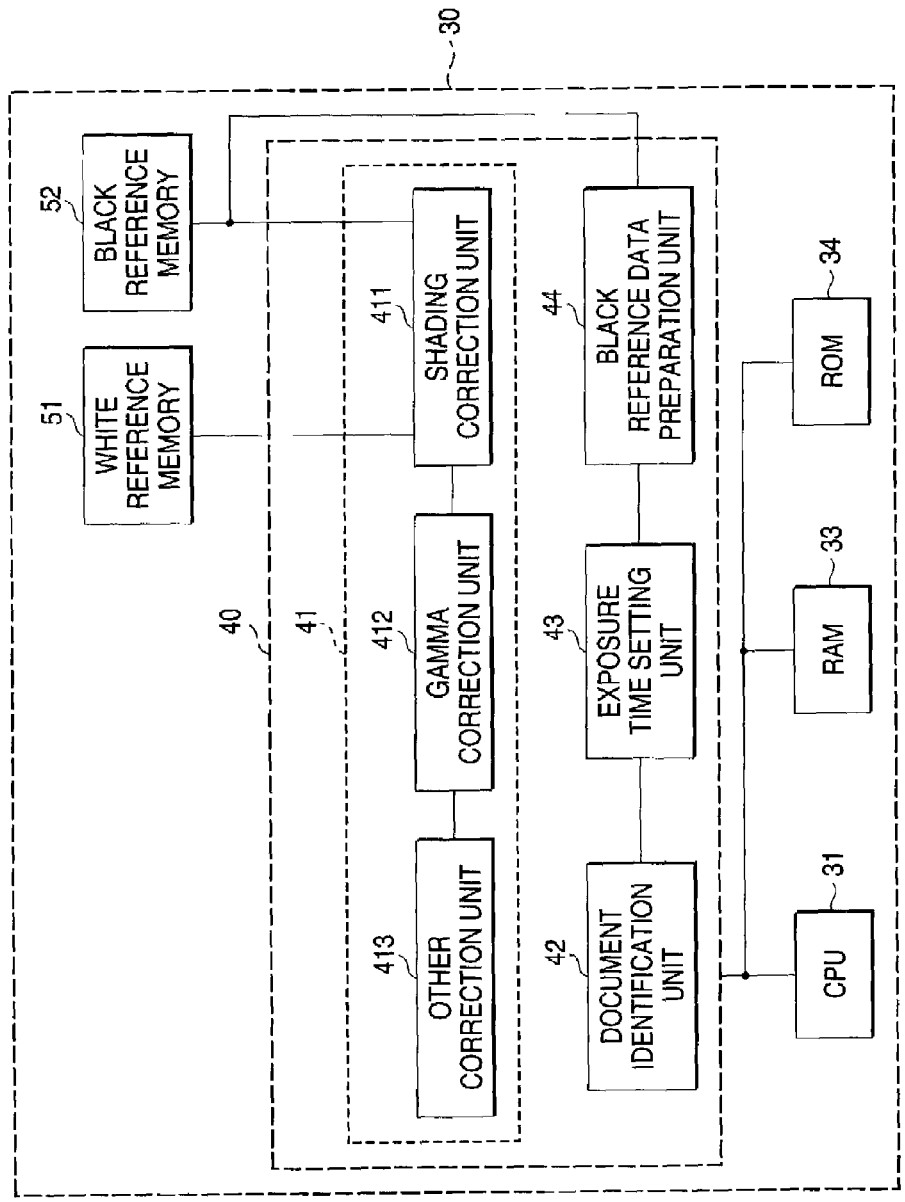
FIG. 1 is a block diagram showing the processor of an image reading apparatus according to one embodiment of the present invention.

One embodiment of the present invention will now be described while referring to the drawings.

Figure 2:
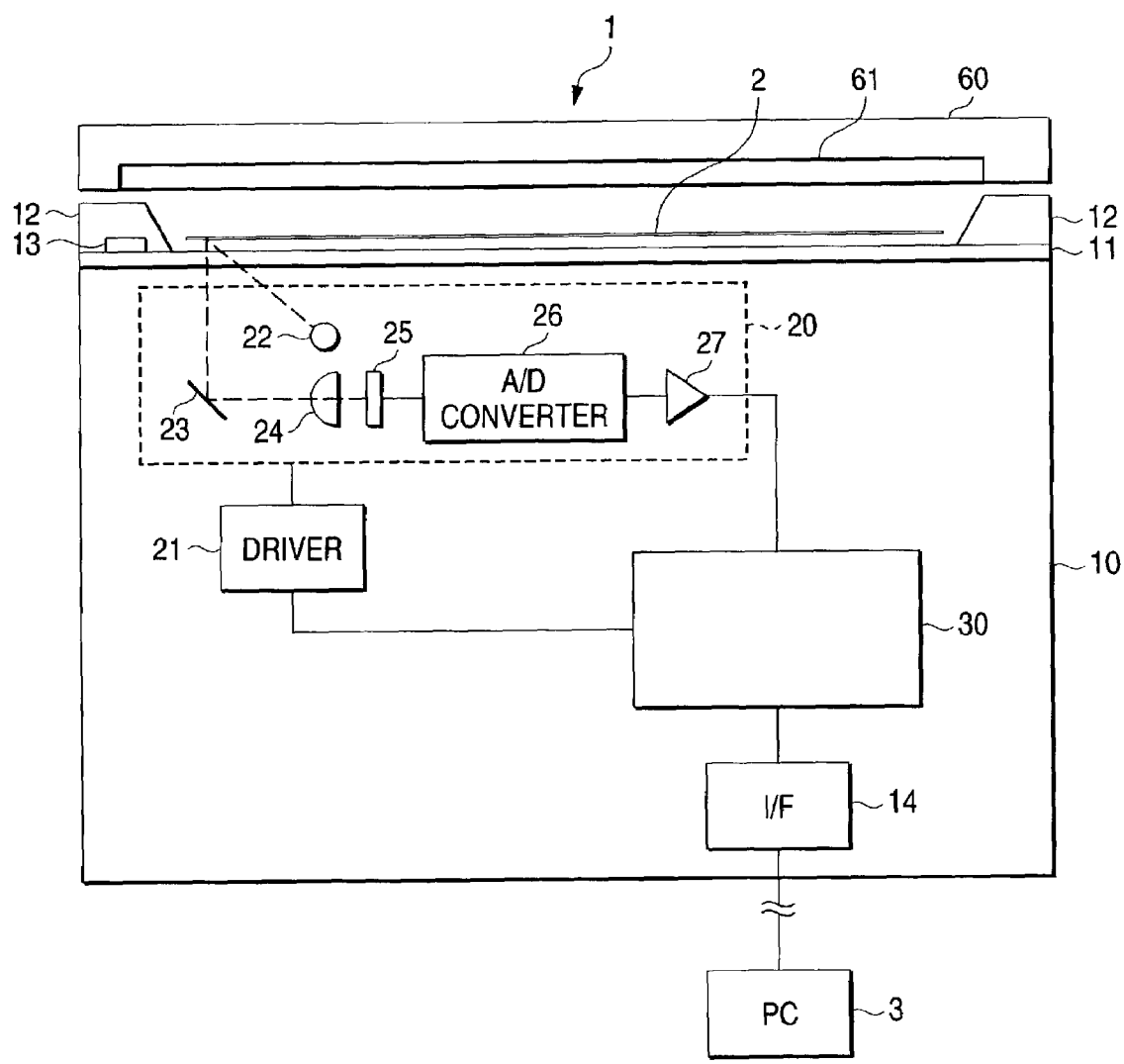
FIG. 2 is a specific diagram showing the image reading apparatus according to the embodiment of the present invention.

An image reading apparatus according to the embodiment of the present invention is shown in FIG. 2.

As shown in FIG. 2, an image reading apparatus 1 comprises a box-shaped main body 10. A document table 11 on which a document 2 is to be placed is disposed on the main body 10. A carriage 20, provided inside the main body 10, can be moved by driver 21 back and forth in the secondary scanning direction parallel with the document table 11.

A fluorescent lamp 22, which serves as a light source, a mirror 23, a condensing lens 24, a line sensor 25 and image pickup device are mounted in the carriage 20. The mirror 23 is provided to condense and reflect light received from the document 2 and to extend the path length of that light, which the condensing lens 24 subsequently guides to the line sensor 25. As the line sensor 25, a charge accumulation optical sensor, such as a CCD, is employed in which multiple pixels are arranged linearly and perpendicular to the direction in which the carriage 20 is moved.

The fluorescent lamp 22 is positioned in a main scanning direction perpendicular to the direction of moving the carriage 20. Light emitted by the fluorescent lamp 22 and reflected by the surface of the document 2, such as paper, is guided to the line sensor 25.

To read a transparent document, such as a positive or a negative film, a light source unit 60 for a transparent document is positioned above the main body 10. The light source unit 60, which is a flat light source, guides light from a lamp light source (not shown) along a light guide plate 61 toward the document table, and uniformly irradiates the document 2. The light emitted by the light source unit 60 passes through the document 2 and is transmitted to the line sensor 25.

An A/D converter 26 converts an analog electric signal output from the line sensor 25 into a digital electric signal. The obtained digital electric signal is output through a buffer 27 to a processor 30. The buffer 27 is used to improve the performance for driving the digital electric signal.

A document guide 12 is provided on the periphery of the document table 11, and is used to position the document 2 in order to prevent its movement while it is being read. A white reference 13 of reflection plane having a uniform, high reflectivity is arranged at the end of the document table 11 in the direction of movement of the carriage.

The processor 30 is mounted inside the main body 10. As is shown in FIG. 1, the processor 30 comprises a CPU (Central Processing Unit) 31, which serves as a controller, a RAM (Random Access Memory) 33, a ROM (Read Only Memory) 34, an image processor 40, and a white reference memory 51 and a black reference memory 52.

The CPU 31 controls all the operations performed by the entire image reading apparatus 1, such as driving of the carriage 20, the turning on or off of the fluorescent lamp 22 and the light source unit 60 and the processing of image data prepared by the image processor 40. The RAM 33 is used to temporarily store image data read by the line sensor 25. A computer program that enables the CPU 31 to control all the individual sections of the image reading apparatus 1 is stored in the ROM 34.

The image processor 40 comprises a correction unit 41, a document identification unit 42, an exposure time setting unit 43 and a black reference data preparation unit 44. And the correction unit 41 includes a shading correction unit 411, a gamma correction unit 412 and the other correction unit 413.

The shading correction unit 411 of the correction unit 41 employs white reference data, which is obtained by reading the white reference 13 before scanning is initiated, and black reference data, which is prepared by the black reference data preparation unit 44, to correct, for the digital signal output by the A/D converter 26, variation in the sensitivity of the individual devices of the line sensor 25 or variation in the amount of light emitted by the fluorescent lamp 22 in the main scanning direction. The obtained white reference data is stored in the white reference memory 51, and the black reference data prepared by the black reference data preparation unit 44 is stored in the black reference memory 52.

The gamma correction unit 412 performs gamma correction using a predetermined gamma function that is set for, and converts into digital image data, a digital light volume signal that is obtained through shading correction. The other correction unit 413 performs various conversions, such as color correction, edge enhancement and area enlargement/reduction.

The digital image data prepared by the image processor 40 is output to an external image processing apparatus, such as a personal computer 3, that is connected to an interface 14 in the main body 10.

The document identification unit 42 determines the type of the document 2 based on the value of an electric signal that is output by the line sensor 25 when the preliminary scanning of the document 2 to be read is performed. Thereafter, the document identification unit 42 determines whether excess exposure is required for the document 2 to be read. A document 2 for which excess exposure is required is an image, such as a negative film in which many dark portions are included, for which the R, G and B information is not balanced; while a document for which excess exposure is not required is a bright image, such as a positive film or an ordinary document, for which the R, G and B information is balanced.

The exposure time setting unit 43 sets the exposure time for the line sensor 25 based on the type of the document 2 that is determined by the document identification unit 42. The method used to set the exposure time will be described later.

The black reference data preparation unit 44 detects a digital signal output by the A/D converter 26 and prepares black reference data. The thus obtained black reference data is then stored in the black reference memory 52.

Figure 3:
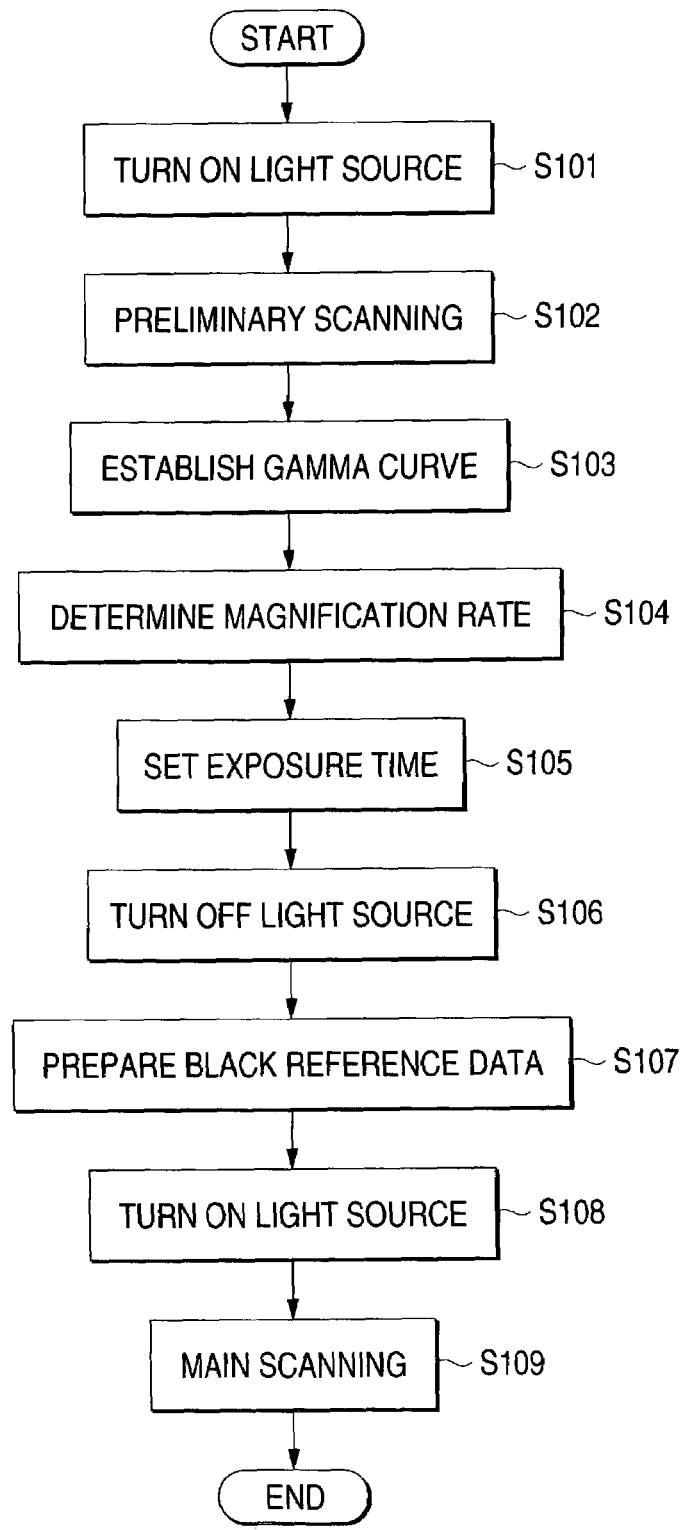
FIG. 3 is a flowchart in which the image data processing is shown that includes a method, performed by the image reading apparatus of the embodiment of the present invention, for the preparation of black referenced at a used for an excess exposure.

An explanation will now be given, with referring to FIG. 3, for the operation of the image reading apparatus 1 and the black reference data setting method according to the embodiment. In the following explanation, the document 2 to be read is a negative film, which is a transparent document.

To read the document 2, the document is arranged on the document table 11. After the document 2 has been arranged on the document table 11, the user employs driver software, such as TWAIN, installed in the personal computer 3 connected to the image reading apparatus 1, to instruct the image reading apparatus 1 to initiate the reading of the document 2. After the reading has been initiated, the CPU 31 of the image reading apparatus 1 detects the connection of the light source unit 60, and turns on the light source unit 60, instead of turning on the fluorescent lamp 22 (S101).

When the amount of light emitted by the light source unit 60 attains a predetermined value, the image reading apparatus 1 begins to perform the preliminary scanning (S102). During the preliminary scanning process, a low resolution, such as 30 dpi, is employed to read the outline of the document 2. The preliminary scanning is performed in accordance with the basic exposure time of the line sensor 25.

After the preliminary scanning has been performed, charges corresponding to the amount of light passing through the document 2 are accumulated by the line sensor 25. Then, the line sensor 25 outputs an analog electric signal that is consonant with the amount of accumulated charges. Thereafter, the A/D converter 26 converts the analog electric signal received from the line sensor 25 into a digital electric signal, and outputs the digital electric signal, through the buffer, 27 to the processor 30.

The electric signal received by the processor 30 is then transmitted to the document identification unit 42, which determines the type of the document 2 that was read during the preliminary scanning. Determining the type of the document 2 is performed in the following manner.

Figure 4:
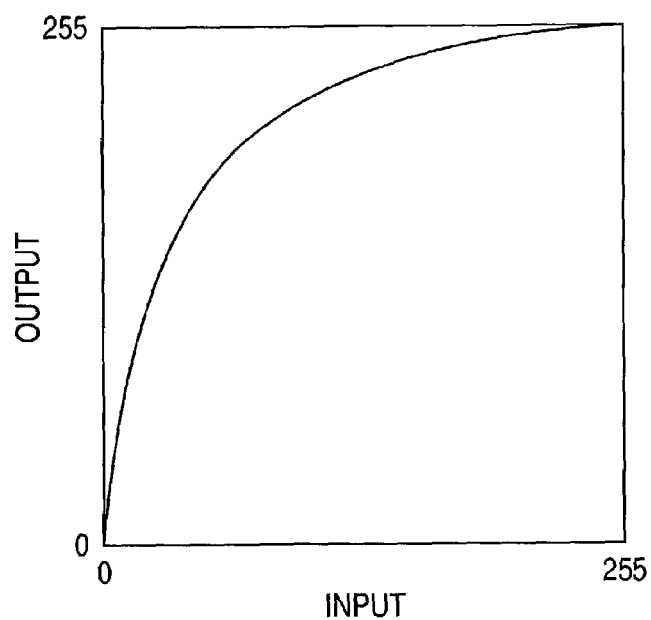
FIG. 4 is a specific diagram showing a gamma curve produced when an ordinary document is read.

The document identification unit 42 establishes a gamma curve based on the output value of the digital electric signal that is obtained by the A/D converter 26 through the conversion of the output signal of the line sensor 25 (S103). For a bright image, such as a reflected document or a positive film having a good color balance, the relationship between the input value and the output value of a gamma curve is shown in FIG. 4. That is, for 256 input and output gray levels, for example, the output value will be 0 when the input value is 0, and the output value will be 255 when the input value is 255.

Figure 5:
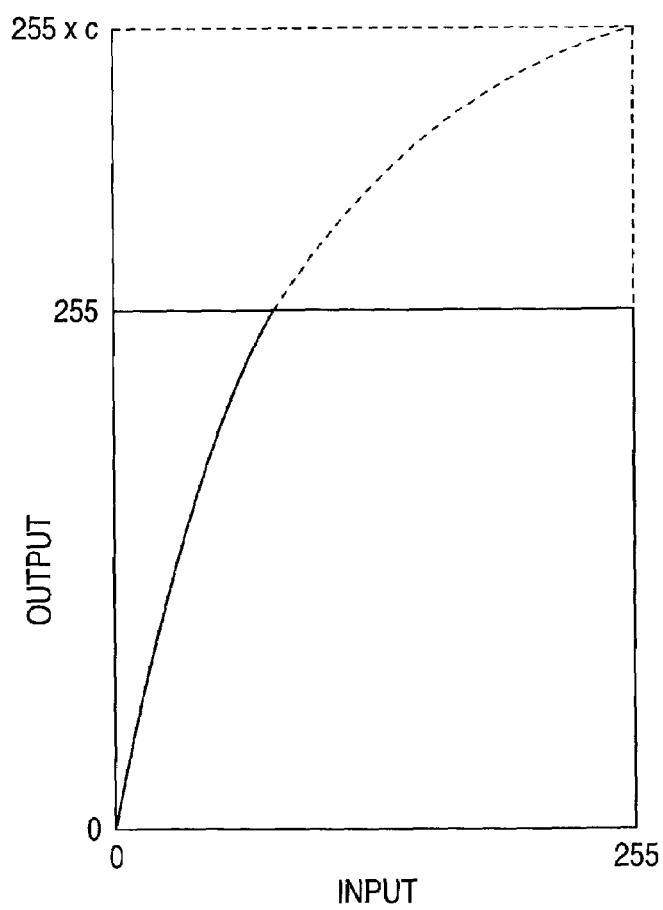
FIG. 5 is a specific diagram showing a gamma curve produced when a negative film is read.

However, when the document 2 is a dark image, as in the negative film used for this embodiment, the gamma curve shown in FIG. 5 is obtained based on the value of an electric signal that is output following the preliminary scanning process performed during the basic exposure time. That is, when the input value is smaller than 255, the output value attained is 255.

Therefore, when the gamma curve established based on the output value of the electric signal during the preliminary scanning process, does not lie within a predetermined area, i.e., an area wherein the output value is 255 when the input value is 255, it is ascertained that the document 2 read during the preliminary scanning is a document that requires excess exposure.

When, as a result of the determination of the type of the document 2 it is ascertained that the document 2 needs an excess exposure to be read, i.e., when the gamma curve does not lie within the predetermined area, the exposure time setting unit 43 performs the following process. The exposure time setting unit 43 adjusts the magnification rate for the gamma curve along the output axis shown in FIG. 5, so that the gamma curve lies within the predetermined area shown in FIG. 4 (S104). As a result, the exposure time setting unit 43 sets an exposure time that is used when the line sensor 25 reads the document 2 (S105).

Exposure times differ depending on the color of the light received by the line sensor 25. For example, of the colors R, G and B for the light received by the line sensor 25, color B requires the longest exposure time. The ratio of the exposure times required for the colors R, G and B is R:G:B=2:1:3. Therefore, the exposure time for B must be set so it is three times the basic exposure time for B, the exposure time for R must be set so it is twice the basic exposure time for R, and the exposure time for G must be set the same as the basic exposure time for G.

When the exposure time is set, the black reference data preparation unit 44 creates black reference data. To prepare the black reference data, the CPU 31 turns off the light source unit 60. Then, while the light source unit 60 is off, i.e., while the entry of light to the line sensor 25 is blocked, the black reference data is prepared based on the value that is output by the A/D converter 26 in accordance with an electric signal output from the line sensor 25. In this embodiment, black reference data is created for each of the multiple pixels constituting the line sensor 25.

The preparation of the black reference data is performed in the following manner. While the entry of light to the line sensor 25 is blocked, the value of an electric signal output from the line sensor 25 is detected 100 times, for example, for each pixel. The detected output values are then averaged for the individual pixels, and black reference-data is prepared for all the pixels constituting the line sensor 25. Thereafter, the thus obtained black reference data are stored in the black reference memory 52.

To create the black reference data, the charge accumulation period for the line sensor 25, i.e., the exposure time, conforms to the exposure time set for the exposure time setting unit 43. For example, when the required exposure time established for the line sensor 25 to receive the light for B when the document 2 is read is set to three times the basic exposure time for B, the exposure time required by the line sensor 25 which receive the light for B when the black reference data is prepared is three times the basic exposure time.

When the black reference data has been prepared, the CPU 31 of the image reading apparatus 1 turns on the fluorescent lamp 22 or the light source unit 60, and reads the white reference 13. The white reference data is prepared by reading the white reference 13, and is stored in the white reference memory 51.

When the white reference 13 has been read, the image reading apparatus 1 is shifted to the main scanning state and the main scanning of the document 2 is begun. To perform the main scanning, a document scanning range or a reading resolution is employed that is designated by a user who is operating the personal computer 3.

During the main scanning, the CPU 31 controls the driver 21 to move the carriage 20 at a constant speed in the secondary scanning direction. Light transmitted through the document 2 enters the line sensor 25 and is converted into a charge, and the charge is accumulated. Then, when the end of the exposure time set by the exposure time setting unit 43 is reached, the accumulated charge is transferred to the shift register (not shown) of the line sensor 25, and an electric signal for one line is output from the line sensor 25. Thereafter, based on the white reference data stored in the white reference memory 51 and the black reference data stored in the black reference memory 52, the image processor 40 performs the shading correction for the digital electric signal produced by the A/D converter 26. Then, gamma and other corrections are performed for the digital electric signal obtained via the shading correction, and the resultant electric signal is output to the personal computer 3, through the interface 14, as digital image data.

When the above process is repeated while the carriage 20 is moved at a constant speed in the secondary scanning direction, the main scanning of the document 2 is performed.

As described above, in accordance with the black reference data setting method for the image reading apparatus 1 according to the embodiment of the invention, when excess exposure is required to read the document 2, the reading of the black reference data is performed during the same period as that required for the excess exposure. Therefore, the black reference data can be prepared in accordance with the exposure time, and the detailed tones of the dark portion can be expressed. Therefore, the quality of the read image can be improved, and color reproduction can be enhanced.

Further, in this embodiment, since the document type is identified by using the gamma curve, whether excess exposure is required for a document can be determined. And the exposure time for the line sensor 25 can be established, therefore, in accordance with the document type, the quality of the read image and the color reproduction can be improved.

In addition, since in this embodiment black reference data are set for each pixel, variation in the sensitivities of the individual pixels can be corrected, and the quality of the image that is read can be improved.

What is claimed is:

1. A black reference data setting method for an image pickup device receiving light from a light source, and outputting an electric signal for setting black reference data used for excess exposure in accordance with the amount of received light, the method comprising a step of:
reading, when an exposure time, that is based on a gamma curve for the image pickup device is n times a basic exposure time a black reference during a period that is n times a period of the basic exposure time, where n>1.

2. A black reference data setting method for excess exposure comprising:
reading an outline of a document by an image pickup device having multiple pixels;
setting a gamma curve that is consonant with the document based on a value of an electric signal outputted from the image pickup device at the reading step;
determining whether the gamma curve is included in a predetermined area;
determining a constant c constituting a magnification rate along an output axis of the gamma curve so that the gamma curve is included in the predetermined area;
setting the exposure time for the image pickup device to constant c times the basic exposure time when determination that the gamma curve is outside the predetermined area is made; and
reading a black reference in accordance with the exposure time set at the setting step, and preparing black reference data.

3. The method according to claim 2, wherein the black reference data are prepared for each pixel constituting the image pickup device.

4. An image reading apparatus comprising:
a light source for projecting light onto a document;
an image pickup device for receiving light from said document and for outputting an electric signal that is consonant with the amount of light that is received;
a document identification unit for determining whether the document is an excess exposure document requiring excess exposure based on the electric signal output from the image pickup device;
an exposure time setting unit for, when the document identification unit determines that the document is an excess exposure document, setting an exposure time for the image pickup device that is a predetermined number times a basic exposure time; and
a black reference data preparation unit for permitting the image pickup device to read a black reference so that an exposure time for reading the black reference is equal to the exposure time set by the exposure time setting unit, and for preparing black reference data.

* * * * *